United States Patent
Van Kley

(10) Patent No.: US 6,276,303 B1
(45) Date of Patent: Aug. 21, 2001

(54) AERATOR HOLDER

(76) Inventor: Scott A. Van Kley, 605 10$^{th}$ St., #3, Rock Valley, IA (US) 51247

( * ) Notice: Subject to any disclaimer, the term of this patent is extended or adjusted under 35 U.S.C. 154(b) by 0 days.

(21) Appl. No.: 09/514,209

(22) Filed: Jun. 27, 2000

Related U.S. Application Data

(63) Continuation-in-part of application No. 09/039,540, filed on Mar. 13, 1998, now abandoned.

(51) Int. Cl.$^7$ ................................................. A01K 63/04
(52) U.S. Cl. ...................... 119/263; 119/256; 119/249; 119/269
(58) Field of Search ................................. 119/263, 256, 119/249, 254, 269, 253, 255, 57.2, 57.7; D23/218; D30/104, 106; 24/462

(56) References Cited

U.S. PATENT DOCUMENTS

| | | | |
|---|---|---|---|
| D. 249,879 | * 10/1978 | Willinger | D11/146 |
| 3,326,184 | * 6/1967 | Greenbaum . | |
| 3,326,185 | * 6/1967 | Perez . | |
| 3,543,283 | * 11/1970 | Cataline . | |
| 3,929,102 | * 12/1975 | Suchowski et al. | 119/254 |
| 4,233,790 | * 11/1980 | Meadows | 52/222 |
| 4,395,973 | * 8/1983 | Hall et al. | 119/57.2 |
| 4,903,629 | * 2/1990 | Maudlin et al. | 114/361 |
| 5,367,985 | * 11/1994 | Wilkins | 119/263 |
| 5,476,068 | * 12/1995 | Townsend | 119/256 |

FOREIGN PATENT DOCUMENTS

4727232 * 4/1951 (CA) .

* cited by examiner

*Primary Examiner*—Charles T. Jordan
*Assistant Examiner*—Yvonne R. Abbott
(74) *Attorney, Agent, or Firm*—Edward M. Livingston, Esq.

(57) ABSTRACT

A holder (4) for retaining an aerator conduit (5) for placement on the bottom (6) of an aquarium tank (1). The holder has a trough with at least one side wall (11a,b) and a retaining means, such as channel (12), in the trough. The holder may be supported in an upright position on the bottom of the aquarium tank by sand and gravel pressing against the outside surface of its side walls. Side walls further keep sand and gravel from covering the aerator conduit. A stabilizer base (14) may be provided on the bottom of the holder. The aerator holder provides for more evenly distributed air bubbles (2) in the aquarium and thus better oxygenation of the water for the fish contained therein. Preferably the holder is made of clear plastic so that it is virtually invisible to an observer, thereby providing an overall more aesthetic appearance for the aquarium.

7 Claims, 2 Drawing Sheets

AERATOR HOLDER

CONTINUING DATA

This application is a Continuation-In-Part of Ser. No. 09/039,540 filed Mar. 13, 1998 now abandoned.

BACKGROUND OF THE INVENTION

This invention relates to aquariums and associated accessories, particularly aerators.

In aquariums aerators are necessary to add oxygen to the water in order for the fish kept therein to survive. Most aerators consist of plastic tubes placed on the side or on the bottom of an aquarium. In such a position the aerators are visible and not aesthetically pleasing. Furthermore, in most cases the air bubbles dispersed from the aerator are not evenly distributed throughout the water and therefore the water is not oxygenated as well as it could be. An even further problem with many present aerators is that when an aerator is placed on the bottom of the tank it may become covered by sand, rock and gravel, thereby not doing an effective job of aerating the water in the aquarium tank.

Thus, a need exists for an aerator conduit holder that hides the aerator, prevents it from becoming covered with sand, rocks and gravel when placed on the bottom of the aquarium, does a better overall job of aerating the water and has an overall more aesthetically pleasing appearance.

The prior patented art includes some aerator conduit holders but none like the present invention. For instance, U.S. Pat. No. 3,326,184 by Greenbaum, issued on Jun. 20, 1967, teaches a conduit line stabilizer which has a channel running along the bottom thereof. However, the latter holder does not have the same structure or purpose as does the present invention. U.S. Pat. No. 3,326,185, issued to Perez on Jun. 20, 1967, discloses an aerator holder in the form of a lighted ornament which holds the aerator off of the bottom of the tank. U.S. Pat. No. 4,038,946, issued to Leuthesser et al. on Aug. 2, 1977, teaches an aeration system for a fish farm tank with an aerator holder that runs along the bottom of the tank. Canadian patent number 472,732, issued to Feldman on Apr. 10, 1951, shows a U-shaped aeration device for an aquarium. U.S. Pat. No. 5,438,959, issued to Stone et al. on Aug. 8, 1995, teaches an aquarium tank with a flat full aerator running in the back of the tank. U.S. Pat. No. 5,367,985, issued to Wilkins on Nov. 29, 1994, shows an aquarium aerator manifold having a grid with holes on the bottom placed on the bottom of the tank. U.S. Pat. No. 3,452,966, issued to Smolski on Jul. 1, 1969, teaches a vertical, tubular aerator device with an internal helix through which bubbles rise, thereby causing a circular motion to circulate the water. Finally, U.S. Pat. No. 950,999, issued to Erlwein et al. on Mar. 1, 1910, shows another aerator device consisting of an elevated tube on the bottom of the aquarium.

SUMMARY OF THE INVENTION

A major object of the present invention is to provide an aerator conduit holder that hides an aerator from view and therefore is more aesthetically pleasing.

Another object of the present invention is to provide such an aerator holder that allows more even distribution of oxygen in the aquarium tank.

A further object of the present invention is to provide an aerator holder that keeps the aerator, particularly the oxygen dispersement holes, from being covered by sand, rocks or gravel at the bottom of the tank for increased effectiveness in oxygenating the water.

The present invention fulfills the above and other objects by providing a holder for placing an aerator conduit along the bottom of an aquarium tank which is an elongated trough with at least one side wall. The trough has a retaining channel at the bottom which size is such that it exerts pressure against an aerator conduit when placed in the channel so that the aerator conduit is held firmly in place. Sand, gravel, rocks or other material on the bottom of the tank pressing against an outside surface of the side walls maintains the holder in an upright position during use. To further stabilize the holder in an upright position during use a planar stabilizer base can be attached to an outside bottom of the trough so that the aerator holder can be placed on or against the bottom of the aquarium or anywhere in the sand and gravel and be supported thereby. Preferably, the holder is made of clear, rigid plastic so that it is virtually invisible to the naked eye during use and may be V-shaped.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
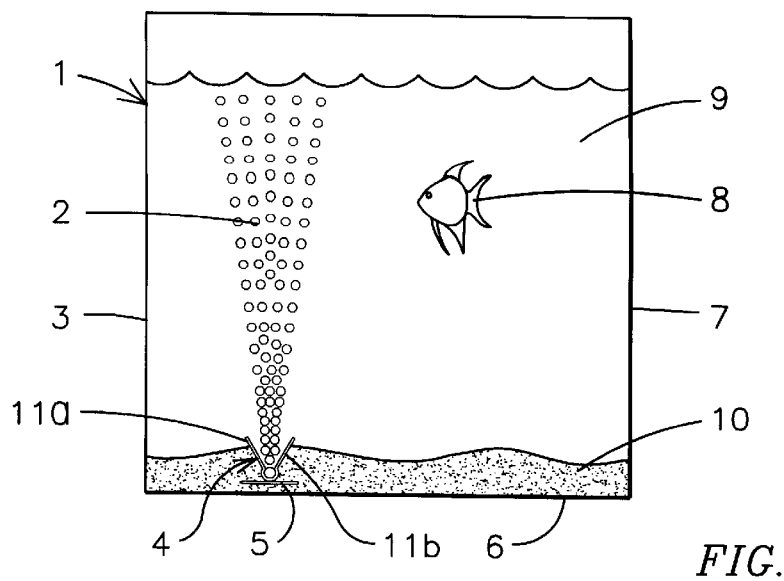
FIG. 1 is a cutaway side view of an aquarium tank showing the aerator holder of this invention with a stabilizer base.

For purposes of describing the preferred embodiment, the terminology used in reference to the numbered components in the drawings is as follows:

1. aquarium tank
2. air bubbles
3. back wall of tank
4. aerator conduit holder
5. aerator conduit
6. bottom of tank
7. front wall of tank
8. happy fish
9. water
10. sand, gravel, rocks
11a, b. side walls of aerator holder
12. retaining channel
13. bottom of holder
14. stabilizer base -continued 15. side wall of tank
16. side wall of tank
17. side walls of aerator holder
18. "U" - shaped retaining clamps
19. stabilizer base
20. aerator attachment
21. aerator conduit end cap Referring now to the drawings in FIG. 1 an aquarium tank 1 containing water 9 is shown having front wall 7, back wall 3 and a bottom 6 having sand, gravel and/or rocks 10 on the bottom thereof. The aerator holder of the present invention 4 is shown placed on the bottom 6 of the tank supported by sand or gravel 10 pressing against the outer surfaces of its side walls 11a and 11b. An aerator conduit 5 is shown placed in the aerator holder 4 with air bubbles 2 being disbursed upward from the aerator holder 5 to oxygenate the water for fish 8.

Figure 2:
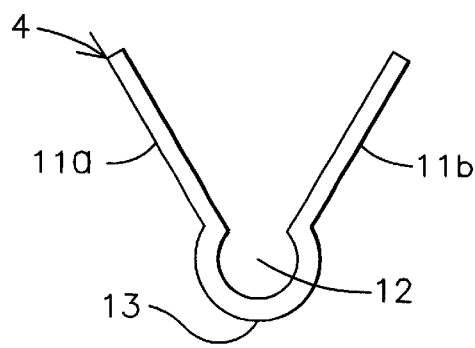
FIG. 2 is an end view of an aerator holder without a stabilizer base.

FIG. 2 shows an end view of the aerator holder 4. The aerator conduit holder has a bottom 13 with two side walls 11a and 11b sloping upwardly and outwardly therefrom. A conduit retaining means consisting of a U-shaped conduit retaining channel 12 runs along the bottom ofD the conduit holder between the walls. The retaining channel 12 is sized to exert pressure on the aerator conduits when it was pressed into the holder so that it is secured in place and does not come loose during use. Other retaining means could include clips, straps or slots at each end of the trough and so forth.

Figure 3:
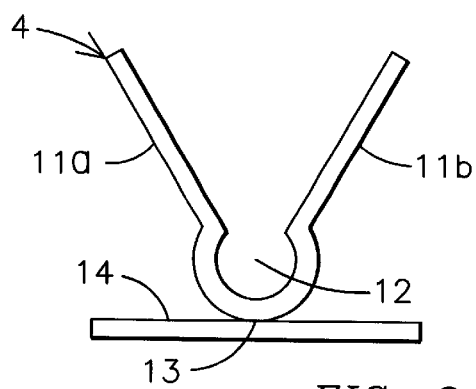
FIG. 3 is an end view of the aerator holder with a planar stabilizer base on the bottom.

FIG. 3 shows the aerator holder 4 with a planar stabilizer base 14 attached to the bottom 13 thereof. Although the aerator holder 4 can be utilized without a stabilizer base 14 and merely supported by the sand and gravel pressing against the outside walls 11a and 11b of the holder the stabilizer base 14 would rest against the bottom of the aquarium tank 6 and provide further support for maintaining the holder in the proper upright position.

Figure 4:
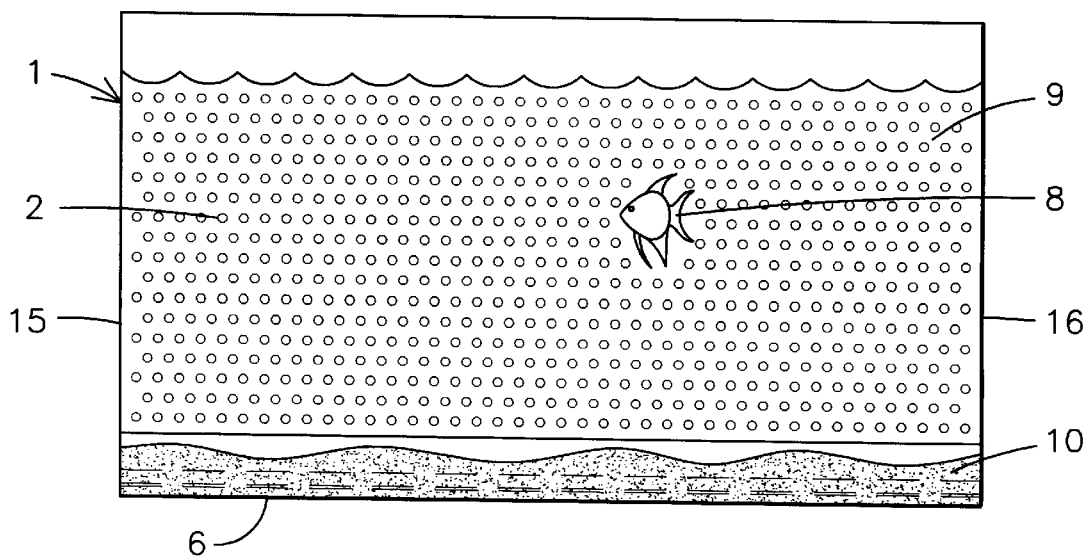
FIG. 4 is a front view of an aquarium tank using the aerator holder showing an even dispersement of air bubbles in the tank.

In FIG. 4 the aquarium tank 1 is shown as it would appear using the aerator holder of the present invention. It should be noted that the present aerator holder will result in an even distribution of air bubbles 2 in the water 9 throughout the aquarium tank from one side 15 to the other 16. Not only does this even distribution of air bubbles allow for better oxygenation of the water 9 but also provides a more aesthetically pleasing appearance to an observer. The aerator holder, particularly when made of clear plastic, is virtually invisible as it rests in the tank 6 in the sand, gravel and rocks 10.

Figure 5:
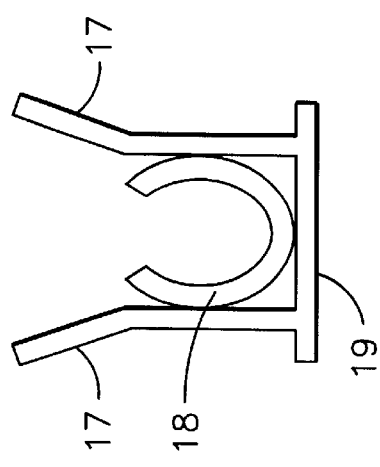
FIG. 5 is an end view of another embodiment of the aerator holder of the present invention having a different stabilizer base and walls and using a plurality of "U"-clamps to hold the aerator conduit in place.

In FIG. 5 another embodiment of the aerator holder of the present invention is illustrated. This embodiment is similar to the first embodiment illustrated in FIG. 3 as it has a planar stabilizer base 19 and two side walls 17 which is spaced apart and connected perpendicularly to the planar stabilizer base 19 to side walls slanted outwardly from the center of the stabilizer base. The major difference between this embodiment and the previous embodiment is the addition of "U"-shaped retaining clamps 18 which is attached to the center stabilizer base 19. The "U"-shaped retaining clamp 18 is open on the top so that an aerator conduit 5 can be pushed through the opening and secured firmly in the "U"-shaped retaining clamps 18.

Figure 6:
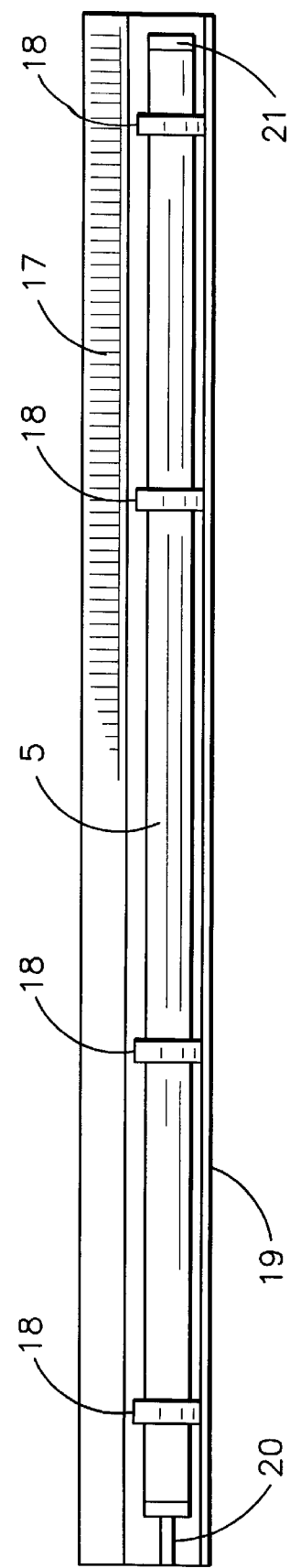
FIG. 6 is a side view of the embodiment of FIG. 5 holding an aerator conduit in place.

FIG. 6 shows a side view of the embodiment of FIG. 5 with an aerator conduit 5 being held in a plurality of "U"-shaped retaining clamps 18. The advantage of this embodiment of the invention over the prior embodiment is that it holds the aerator conduit more firmly in place and keeps it from becoming detached during use. The aerator conduit has an aerator hose attachment 20 at one end and a cap 21 on the other end.

Although only a few embodiments of the present invention have been described in detail hereinabove, all improvements and modifications to this invention within the scope or equivalents of the claims are covered by this invention.

Having thus described my invention, I claim:

1. A holder for placing an aerator conduit along a bottom of an aquarium tank, said holder comprising:

an elongated trough with at least one side wall extending upwardly and outwardly from said trough having a flexible aerator conduit retaining means in a bottom of the trough, said retaining means having an internal diameter slightly less than an external diameter of the aerator conduit; and an elongated planar stabilizer base attached to an outside bottom of at least one side wall of the trough.

2. The aerator holder of claim 1 further comprising:

a planar stabilizer base attached to an outside bottom of the trough.

3. The aerator holder of claim 2 wherein the holder is made of clear plastic.

4. The aerator holder of claim 1 wherein the holder is made of clear plastic.

5. The aerator holder of claim 1 wherein the trough is V-shaped.

6. The aerator holder of claim 1 wherein the aerator conduit retaining means is a channel in a bottom center of the trough.

7. The aerator holder of claim 1 where in the flexible aerator conduit containing means comprises one or more substantially "U"-shaped clamps attached to the bottom of the trough, said clamps having an opening on top through which the conduit can be inserted and held firmly in place.

* * * * *